No. 849,727. PATENTED APR. 9, 1907.
W. P. CRARY.
LAMP BRACKET.
APPLICATION FILED MAY 26, 1906.
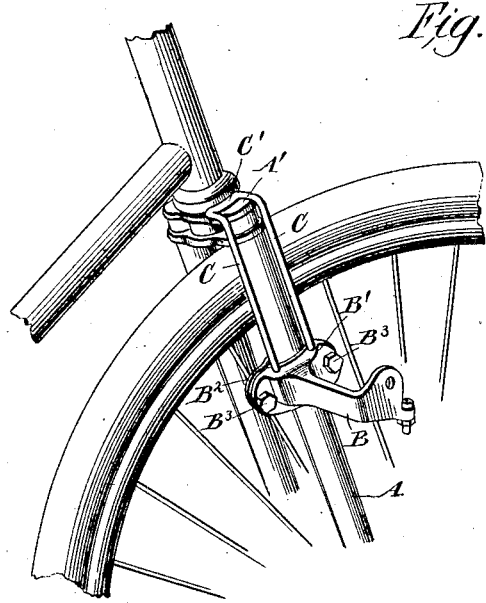
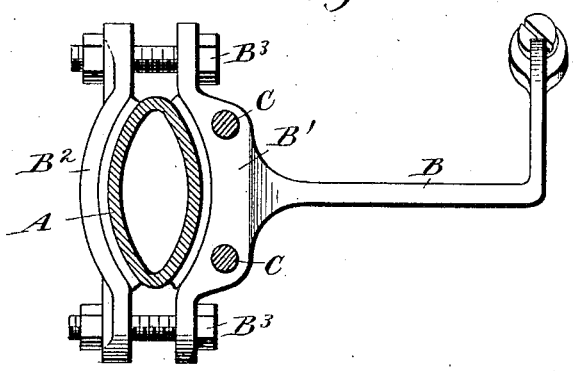
WITNESSES
INVENTOR
William P. Crary,
BY
Charles R. Searle,
ATTORNEY

UNITED STATES PATENT OFFICE.

WILLIAM P. CRARY, OF NEW YORK, N. Y.

LAMP-BRACKET.

No. 849,727.  Specification of Letters Patent.  Patented April 9, 1907.

Application filed May 26, 1906. Serial No. 318,791.

*To all whom it may concern:*

Be it known that I, WILLIAM P. CRARY, a citizen of the United States, residing in the city of New York, borough of Manhattan, in the county and State of New York, have invented a certain new and useful Improvement in Lamp-Brackets, of which the following is a specification.

The invention relates to lamp-brackets for bicycles, motor-cycles, and analogous vehicles, and more particularly to brackets intended for attachment to tapering frame members, such as the front forks of such vehicles.

The object of the invention is to provide a bracket which shall be simple in construction and neat and attractive in appearance and capable of attachment to the front fork or like member in such manner as to prevent its disengagement by the vibrations and shocks to which the frame of a bicycle or motor-cycle is subjected in service.

The invention consists in certain novel features of construction and arrangement by which the above objects are attained, to be hereinafter described.

The accompanying drawings form a part of this specification and show the invention as it has been carried out in practice.

Figure 1 is a perspective view showing the bracket in place on the front fork of a bicycle. Fig. 2 is a plan view, on a larger scale, partly in horizontal section.

Similar letters of reference indicate the same parts in both figures.

On account of the taper usually given the vertical members of the front fork it is difficult to clamp a bracket thereto with sufficient friction to maintain its position, especially on motor-cycles, because of the vibration due to the motor. I have devised a bracket adapted to be clamped as usual to the fork, but also having means for engaging the fork-crown, and thus preventing any downward movement toward the small end of the fork.

A is the front fork of a bicycle or motor-cycle, and A' the crown.

B is the arm, B' the body, and B² the clamp, of a lamp-bracket. These parts may be as usual and held to the fork member by bolts B³, extending through lugs on the body and clamp.

C is a rod or length of heavy wire extending upwardly in the form of a loop from the body B', to which its ends are secured, and having its bight C' bent inwardly toward the bicycle-head to lie upon the upper face of the fork-crown. Thus arranged, the engagement of the rod with the crown holds the bracket against sliding downward along the tapering surface even though the bolts B³ may be slightly loosened by vibration. The engagement will be maintained until the clamp is so slackened as to permit the bracket to turn on the elliptically-shaped fork member far enough to allow the escape of the rod from the crown.

Although I have shown the invention as applied to a fork having a straight crown, it will be understood that the loop or rod will similarly engage a curved crown.

I claim—

1. A lamp-bracket constructed to be clamped to the front fork of a bicycle or like vehicle, in combination with a rod fastened to said bracket and extending upwardly therefrom, constructed to engage with said fork-crown.

2. A lamp-bracket constructed to be clamped to the front fork of a bicycle or like vehicle, in combination with a rod in the form of a loop, having its ends fastened to said bracket and its bight bent to engage said fork-crown.

3. The new article of manufacture described, consisting of a lamp-bracket adapted to be clamped to the front fork of a bicycle or like vehicle, and an upward extension from said bracket adapted to engage the crown of a front fork to which said bracket is clamped.

In testimony that I claim the invention above set forth I affix my signature in presence of two witnesses.

WILLIAM P. CRARY.

Witnesses:
 CHAS. A. HAUCK,
 CHARLES R. SEARLE.